United States Patent [19]

Ruckl

[11] Patent Number: 4,948,940
[45] Date of Patent: Aug. 14, 1990

[54] DEVICE FOR TREATING A BODY WITH A BEAM OF RAYS

[75] Inventor: Siegfried Ruckl, Kufstein, Austria

[73] Assignee: Schablonentechnik Kufstein GmbH, Austria

[21] Appl. No.: 367,247

[22] Filed: Jun. 16, 1989

[30] Foreign Application Priority Data

Jun. 17, 1988 [NL] Netherlands ............. 8801551

[51] Int. Cl.$^5$ ............................................. B23K 26/00
[52] U.S. Cl. ........................... 219/121.68; 219/121.78; 219/121.83
[58] Field of Search ................ 219/121.68, 121.69, 219/121.78, 121.83, 121.8, 121.6, 121.85

[56] References Cited

FOREIGN PATENT DOCUMENTS

| A241567 | 12/1986 | German Democratic Rep. | |
| 0054487 | 3/1984 | Japan | 219/121.83 |
| 0156090 | 7/1987 | Japan | 219/121.83 |

OTHER PUBLICATIONS

Feinwerktechnik & Messtechnik, vol. 94, No. 1, Jan.-/Feb. 1986, pp. 37-39, Carl Hanswer Verlag, DE; E. Wagner: "Halbleiterlaser in Systemen der Messtechnik".
Patent Abstracts of Japan, vol. 8, No. 79 (P-267) [1516], Apr. 11, 1984; & JP-A-58 223 107 (Minolta Camera K.K. 24-12-1982).
Patent Abstracts of Japan, vol. 10, No. 241 (P-488) [2297], Aug. 20, 1986; & JP-A-61 72 214 (Nippon Jido Seigyo K.K.) 14-04-1986.

*Primary Examiner*—C. L. Albritton
*Attorney, Agent, or Firm*—Ostrolenk, Faber, Gerb & Soffen

[57] ABSTRACT

A device (1) for programmed spot treatment of a body with a beam of rays, particularly a laser beam (7), using a lens system (4), in which the point of impact of the beam (7) describes a predetermined pattern on the surface of the body particularly a lacquer sealed rotary screen printing stencil 3a, as a result of a relative movement of the body with respect to the device. According to the invention the device (1) has means for maintaining a constant predetermined distance between the center of the lens system (4) and the center of the point of impact of the beam (7) of rays with the surface of the body. Said means for maintaining a constant distance comprise distance-determining means, preferably a scanner of the optical, inductive or capacitive type, for determining the distance of the surface of the body from a lens system (4) located between a light source and the body, displacement means (11,12,12',14,14',15), preferably electromagnets cooperating with anchoring plates and spring packets, for displacing the lens system, and control means, preferably a microprocessor, for controlling the displacement means (11,12,12',14,14',15) according to the difference between a set value and the measured value of the distance between the lens system and the surface of the body. The stencil 3a is supported by a roller 3.

8 Claims, 4 Drawing Sheets

DEVICE FOR TREATING A BODY WITH A BEAM OF RAYS

BACKGROUND OF THE INVENTION (1) Field of the invention

The invention relates primarily to a device for programmed spot treatment of a body with a beam of rays, using a lens system, in which the point of impact of the beam of rays describes a predetermined pattern on the surface of the body as a result of a movement which the body and the device carry out relative to each other.

(2) Description of the prior art

An example of such a device is described in DRG patent specification No. 241,567. This reference discloses a device for the treatment of a cylindrical clamped screen printing stencil with a laser beam. The screen printing stencil comprises a perforated sheet or a stencil gauze the perforations of same being sealed by means of a sealing agent such as a lacquer. The stencil is then treated in a programmed manner with a laser beam, so that the perforations being struck by the laser beam are stripped of their lacquer, and a cylindrical printing plate is formed in this way.

However, the invention is not limited to the type of device as described in the above-mentioned reference. In general, the invention relates to devices in which a particular treatment can be carried out on a body with a beam of rays. Examples are: exposure of a clamped film material, photo-curing of a clamped photopolymer material etc. Nor need the beam of rays used be limited to laser light; other light beams which have to be focused for efficient working also fall within the scope of the disclosure of the device according to the invention.

The body on which the beam acts will often be cylindrical; but a flat shape can also occur.

Such known devices have the disadvantage that the effect of their action is very sensitive to even very minor change in the distance of the lens to the surface of the body, since only the optimum action of a laser beam burning away, for example, lacquer is obtained if the focal point of the lens used remains on the surface of the body to be treated with radiation, or so far below said surface as is desirable in connection with the effect to be obtained. A consistently correct distance is, however, not simple to achieve, due to faulty settings and inaccuracies which may occur, including rotational and surface displacement inaccuracies.

SUMMARY OF THE INVENTION

The object of the invention is to provide a solution to the above problem.

This object is attained according to the invention, by a device of the type indicated, said device having means for maintaining a constant predetermined, distance between the center of the lens system and the center of the point of impact of the beam of rays with the surface of the body.

By including means with which the distance between the center of the lens system and the center of the point of impact of the beam of rays with the surface of the body can be kept constant, it can be ensured that the focus of the lens remains on the surface of the body, the result of which is that any patterns to be formed can be made extremely sharp. The accuracy with which, for example, a screen printing stencil is made has a very great influence on the final result on the material to be printed; by patterning a screen printing stencil with a device according to the invention, a very accurate pattern formation is obtained and with great reproducibility. In particular, the means for maintaining a constant distance are distance-determining means i.e. a sensor for determining the distance of the surface of the body to a lens system located between a light source and the body; displacement means for displacing the lens system, and control means i.e. a microprocessor for controlling the displacement means according to the difference between a set value and the measured value of the distance between the lens system and the surface of the body.

The sensors are generally used for determining the distance between, the lens system and the body to be treated. Said sensors can be of different types such as: optical, inductive or capacitive scanners.

The lens system in the device according to the invention is advantageously accommodated in a housing which is also provided with means as described in the characterizing part of claim 5. The housing in the embodiment described acts as the fixed point relative to which the position of the lens in relation to the surface of the body, such as a rotary roller, is measured and kept constant. The electronic means present are preferably in the form of a microprocessor.

In a preferred embodiment of the device according to the invention the beam of rays used is a laser beam, by means of which the device can be used to open perforations in a metal screen printing stencil which are sealed with a masking agent, and the opened perforations are arranged in groups which together form a predetermined pattern.

If the device is designed in the form of a laser engraving device, as known from DRG No. 241,567, it is constructed as follows. The body has a drum with a stencil clamped thereon, the perforations of which are sealed. By means of a laser beam the perforations can be opened in a programmed manner by burning away the sealing.

Very good results are obtained through the use of special lacquers and lasers of suitable wavelength and power.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE PREFERRED EMBODIMENTS

Figure 1:
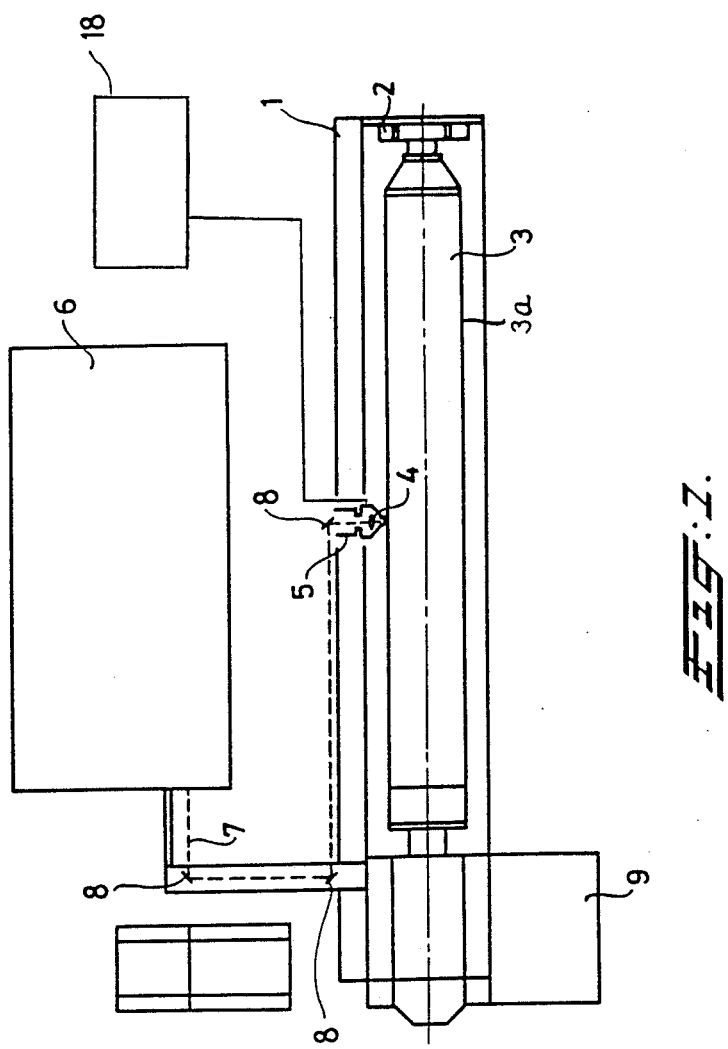
FIG. 1 shows schematically a top view of a device for treating a rotary screen printing stencil whose perforations are sealed by means of a lacquer with a laser beam.

FIG. 1 indicates by reference number 1 a device according to the invention; in this case a laser engraving device for forming a pattern of opened perforations using a laser beam in a lacquer-sealed rotary screen printing stencil 3a. A suitable rotary screen printing stencil is, for example, seamless nickel stencil with a fineness between 80 and 500 mesh or more (80-50 perforations per linear inch=25.4 mm) and a thickness of 75-200 μm. The device is provided with a roller 3 which is firmly connected at one side to a drive in a housing 9, and at the other side rests on a galvanizable support 2. The roller 3 is capable of accommodating a stencil 3a for treatment in such a way that the stencil 3a is centered round the shaft of the roller 3. The laser beam 7 from the laser 6 is guided with the mirrors 8 to a lens or lens system 4 inside a housing 5. During the operation of the device the roller 3, with a stencil 3a (not shown separately) fitted thereon is turned about its axis, at a constant angular speed, while the housing 5 with the lens 4 is moved, often by means of a spindle, at a fixed distance from and parallel to the shaft of the roller. The point of impact of the laser beam focused through the lens 4 then describes a cylindrical or spiral pattern on the surface of the stencil clamped on the roller.

Figure 2:
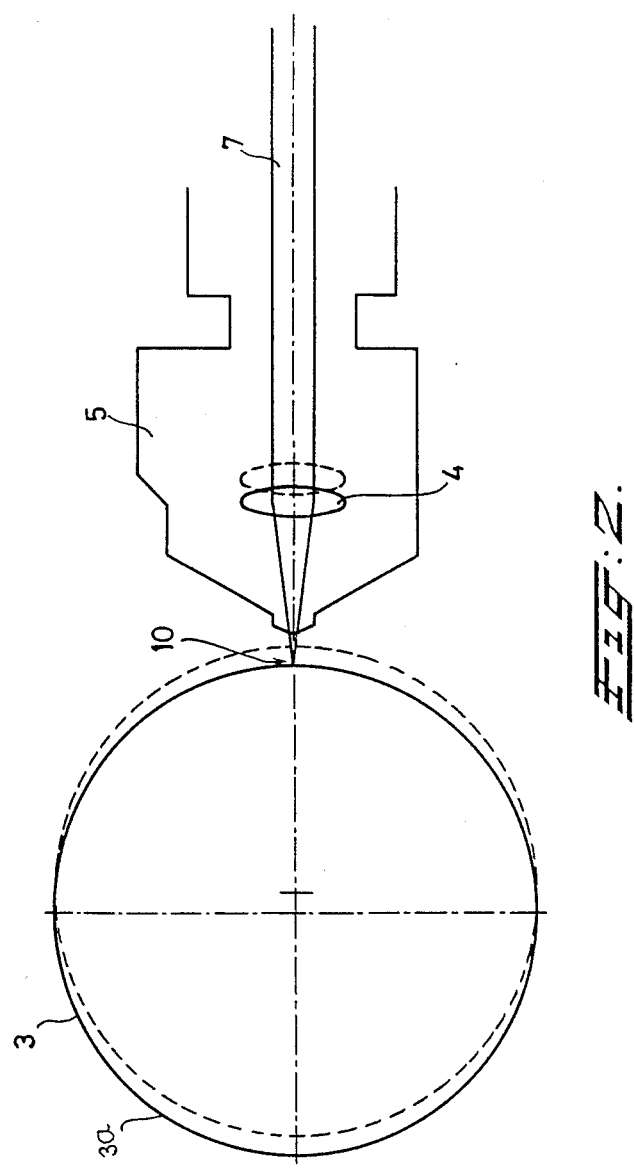
FIG. 2 shows schematically a cross-sectional view for a housing, a lens system and a cylindrical roller which form part of the device in FIG. 1.

FIG. 2 shows schematically the mode of operation of the means for maintaining a constant distance between the lens system or the lens 4 and the surface of a stencil 3a clamped on the roller 3.

A dotted line shows that the roller 3 exhibits an eccentricity. The focus of the lens 4 is indicated by 10. The lens is accommodated inside the housing 5.

As a result of the occurring eccentricity of the roller during rotation, the lens must be displaced as indicated by the dotted line, in order to keep the focus 10 on the surface of the roller.

Figure 3:
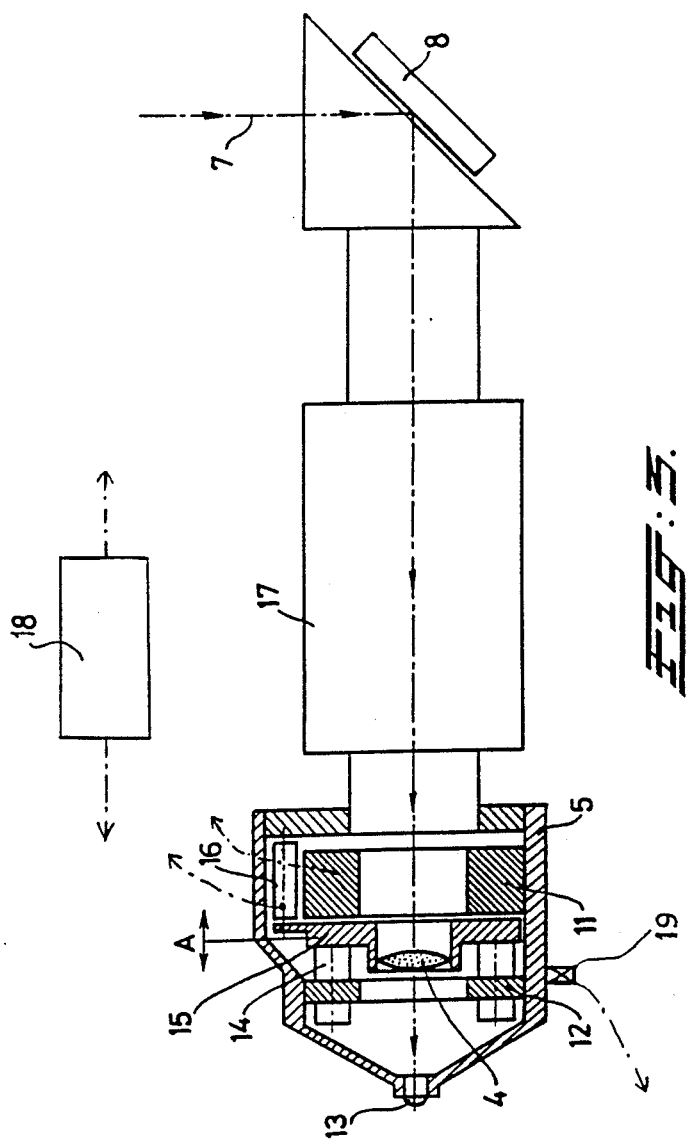
FIG. 3 shows a mirror, a housing and a lens system in the device of FIG. 1.

FIG. 3 shows more clearly how the laser beam 7 arrives on a reflection means in the form of a mirror 8, as a result of which the laser beam is deflected and reaches the lens system 4 through a connecting device 17. During the burning process a sensor 19 outside the housing records the distance of the surface of the roller from the housing, and another sensor 16 inside the housing records the distance or location of the lens system 4 relative to the housing 5. By an arithmetical operation, the electronic means present in the form of microprocessor 18 calculate the distance between the lens system and the surface of the roller. This distance is compared with a set value and according to the difference between this set value and the measured value the electromagnets 11 are energized. When the electromagnets 11 are energized the result is that the lens system moves in the direction of the retaining plate 12 as a result of the lens mounting in the form of anchor plate 15 working in concert with the electromagnets. During this movement of the lens in the direction of the retaining plate 12 spring packets between the lens mounting and the anchor plate are compressed round the guides 14 which return the lens mounting to its original position when the electromagnets are switched off. This device therefore permits continuous focusing in which the device has correction circuits and/or damping circuits if desired for synchronization of the lens adjustment and measured roller eccentricity.

Figure 4:
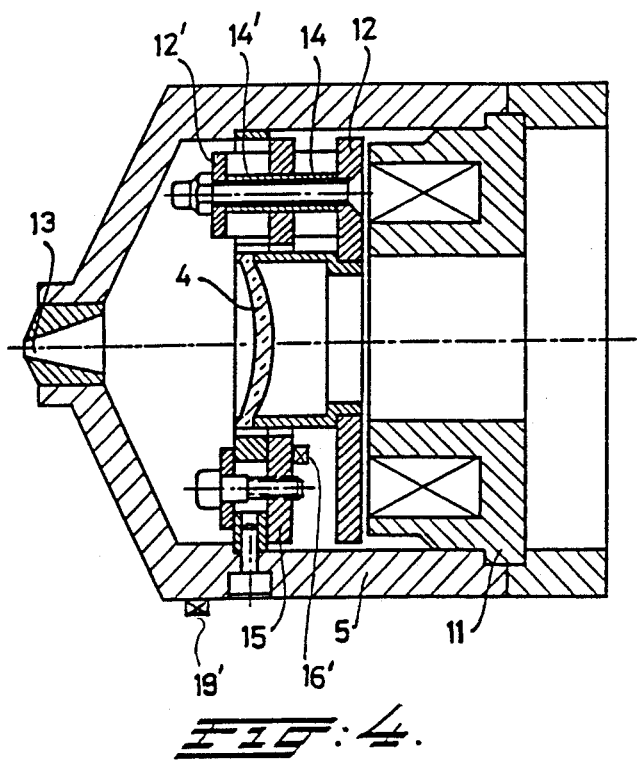
FIG. 4 shows the housing with the lens system on an enlarged scale.

FIG. 4 shows another example of an embodiment. In this example the lens mounting is fitted in an anchor plate 12 which is connected by means of rods to a plate 12'. Plate 15 is connected to the housing. Spring packets (14, 14') are again provided between the plate 15 and the parts 12 and 12'. In this example of an embodiment the movement of the lens relative to the housing is carried out as follows. As a result of its design, the lens is capable of being moved in two directions by the electromagnets, depending on the direction of current. In one case the lens is moved with anchor plate 12 in the direction of the plate 15, and after the electromagnet is switched off is moved back to the centre position again by the spring packet 14, while in another case the lens is moved in the opposite direction, and after the electromagnet is switched off is moved back again to the centre position, but this time by the spring packet 14'. The result of this is that the lens system can be corrected in two directions relative to the surface of the roller.

Apart from these examples of embodiments, there are, of course, other possibilities for the correction movement of the lens system relative to the housing, such as: a threaded lens system which is driven by a motor with gear wheel etc., but these all come within the scope of the present invention.

As a result of this autofocusing, the maximum revolution speed of the roller can be greatly increased, since the device is extremely well equipped to compensate for the associated eccentricity, resulting in the disadvantages discussed above.

I claim:

1. A device for programmed spot treatment of a body with a beam of rays, using a lens systems, in which the point of impact of the beam describes a predetermined pattern on the surface of the body as a result of a movement which the body and the device carry out relative to each other, wherein the device has a source of rays, a lens system for directing rays from the source toward the surface of the body; and means for maintaining the constant predetermined distance between the lens system and the center of the point of impact of the beam of rays with the surface of the body as the body and the device move relatively.

2. A device according to claim 1, wherein the means for maintaining a constant distance comprise distance-determining means for determining the distance of the surfaces of the body from a lens system located between light source and the body; displacement means for displacing the lens system, and control means for controlling the displacement means according to the difference between a set value and the measured value of the distance between the lens system and the surface of the body.

3. A device according to claim 2, wherein the distance-determining means are in the form of a sensor.

4. A device according to claim 3, wherein the sensor is selected from the group consisting of optical, inductive and capacitive type sensors.

5. A device according to claim 2, wherein the lens system is accommodated in a housing which comprises a body sensor which measures the distance from a fixed point on the housing to the surface of the body and a lens sensor which measures the distance from a fixed point on the housing to the lens system, and electronic means for performing an arithmetical operation to calculate from the distance values measured by the sensors the distance between the lens system and the surface of the body, the electronic means also being connected to control the energization of the displacement means for displacing the lens system relative to the housing according to the difference between a preselected set value and the thus measured value for the distance between the lens system and the surface of the body.

6. A device according to claim 5, wherein the electronic means are in the form a microprocessor.

7. A device according to claim 2, wherein the distance determining means are in the form of a sensor.

8. A device according to claim 2, wherein the lens system has a center in the direction toward the body; and the maintaining means being for maintaining a constant distance between the center of the lens system and the center of the point of impact of the beam.

* * * * *